United States Patent [19]

Dewey et al.

[11] Patent Number: 4,901,206
[45] Date of Patent: Feb. 13, 1990

[54] TEST SHOE

[75] Inventors: James Dewey; Karl H. Pohl, both of Plymouth; Patrick J. Brickley, Long Lake, all of Minn.

[73] Assignee: ADC Telecommunications, Inc., Minneapolis, Minn.

[21] Appl. No.: 156,543

[22] Filed: Feb. 16, 1988

[51] Int. Cl.⁴ .............................................. H02B 1/02
[52] U.S. Cl. .................................. 361/428; 361/413; 361/429; 379/19; 379/327; 379/329
[58] Field of Search ....................... 324/73 PC, 158 F; 361/391, 392–394, 413, 426, 428–429; 379/15–17, 19, 327, 329

[56] References Cited

U.S. PATENT DOCUMENTS

| | | | |
|---|---|---|---|
| 3,509,297 | 4/1970 | King | 200/51 |
| 3,996,516 | 12/1976 | Luther | 324/158 F |
| 4,128,739 | 12/1978 | Bernstein | 379/19 |
| 4,386,243 | 5/1983 | De Luca et al. | 379/19 |
| 4,590,335 | 5/1986 | De Luca et al. | 379/17 |
| 4,747,020 | 5/1988 | Brickley et al. | 361/428 |

OTHER PUBLICATIONS

Specification sheet showing & describing AT&T Technical Systems Block, Catalog No. 299A Test Adapter (Comode 103065819), 10/84, p. 7.24

Primary Examiner—Gregory D. Thompson
Attorney, Agent, or Firm—Merchant, Gould, Smith, Edell, Welter & Schmidt

[57] ABSTRACT

A wire distribution apparatus is disclosed and includes a wire termination module having a cross connect field and a protector field electrically wired to the cross connect field. The cross connect field includes a plurality of electrical contact points arranged in a predetermined array. A test member is provided for accessing test equipment to test signals carried by conductors connected to the cross connect field. The test member includes a housing which is releasably attachable to the module in a predetermined position. A plurality of electrical contact members are carried by the housing and have exposed contact ends arranged in a second array with the ends disposed to electrically engage the test contact points when the housing is attached to the module in a predetermined position. Electrical connectors are carried on the housing for electrically connecting circuit test equipment to the electrical contact members.

6 Claims, 5 Drawing Sheets

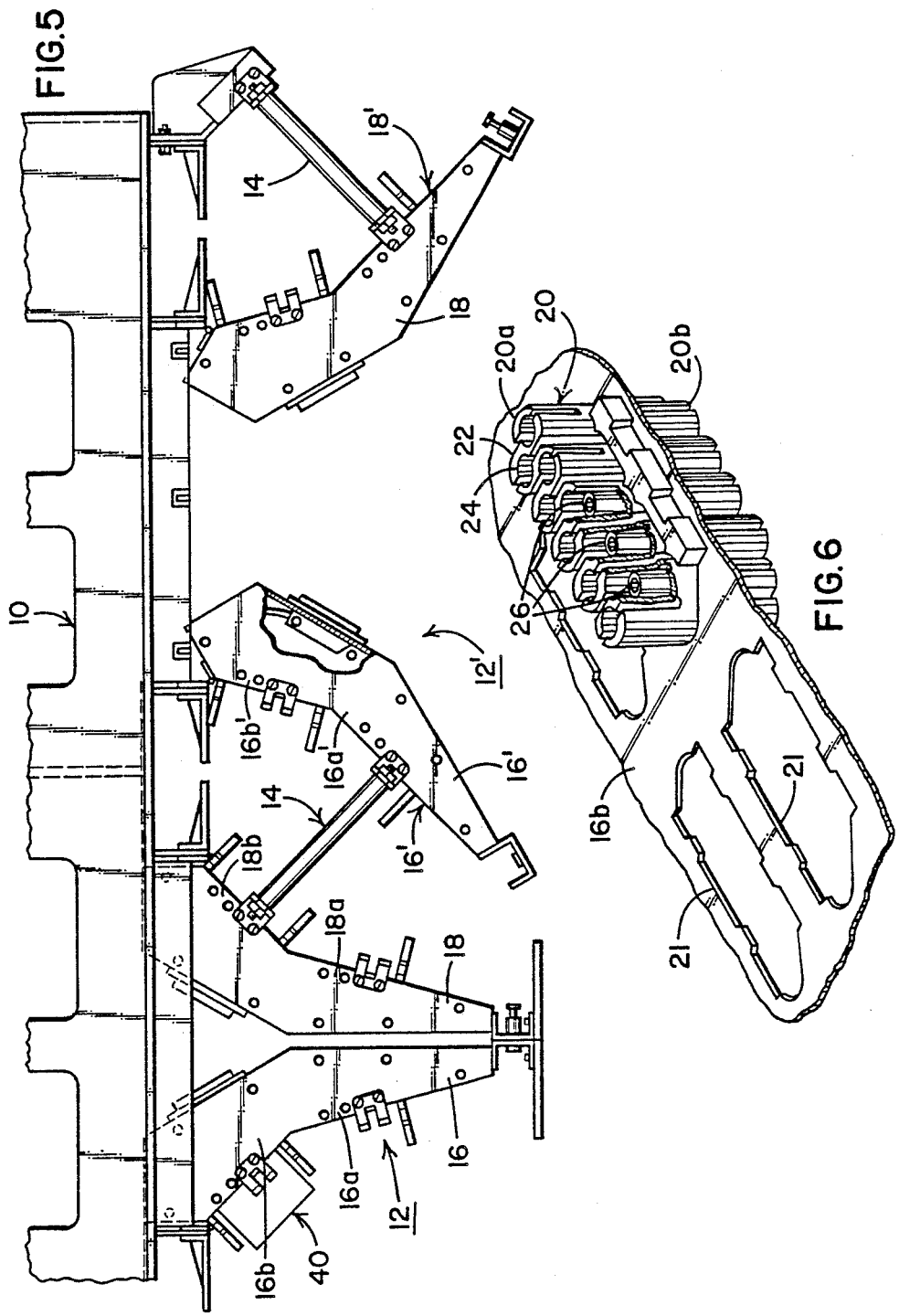

TEST SHOE

BACKGROUND OF THE INVENTION

I. Field of the Invention

This invention pertains generally to the field of telecommunications and to apparatus for distributing wires or cross connecting telecommunication lines. More particularly, this invention pertains to a test shoe for temporarily accessing said lines.

II. Description of the Prior Art

Wire distribution apparatus are widely used in the telecommunications industry to interconnect equipment lines and distribution lines. An example of a wire distribution apparatus is shown in copending and commonly assigned U.S. patent application Ser. No. 864,023, filed May 16, 1986, and entitled "WIRE DISTRIBUTION APPARATUS". The apparatus of U.S. patent application Ser. No. 864,023, includes a plurality of termination modules formed of two hinged panels. Each of the panels include a plurality of electrical connectors.

In a wire distribution apparatus such as that described in the aforementioned patent application, it is desirable to provide the electrical connectors of the apparatus with circuit protector elements. It is also desirable to provide access of test equipment to the conductors terminated on the wire distribution apparatus. Commonly, wire distribution apparatus would include three segregated areas or fields. These would include a wire termination field, a protector field and a test field. Access to the test field would commonly be provided by adaptor equipment or test shoes. An example of such is the AT&T test shoe referred to as the AT&T Technical Systems Block, Catalog No. 299A Test Adaptor (Comcode 103065819).

The use of separate test fields takes up substantial space in a wire distribution area thereby reducing the density of the cross-connect fields. Alternatively, such test connectors would be connected directly to access points of protector elements. However, such accessible protector elements are costly.

SUMMARY OF THE INVENTION

According to a preferred embodiment of the present invention, a wire distribution apparatus is provided which includes a detachable test member. The distribution apparatus includes a wire termination module with walls defining an interior separated from an exterior. A plurality of electrical connectors are carried on the module and present a first plurality of electrical contact points exterior of the module and a second plurality of electrical contact points disposed within the interior of the module. The connectors also include a plurality of electrical test contact points which are disposed in a predetermined array and exposed to the exterior. The wire distribution apparatus further includes a plurality of circuit protector elements which are carried on the module with circuit means electrically connecting the elements with the connectors. A test member is provided for accessing test equipment to test signals carried by conductors connected to the electrical connectors. The test member includes a housing with means for releasably attaching the housing to the module in a predetermined position. A plurality of electrical contact members are carried by the housing and have exposed contact ends arranged in an array with the second ends disposed to electrically engage the test contact points when the housing is attached to the module in the predetermined position. An electrical connector is carried on the housing for electrically connecting circuit test equipment to the electrical contact members.

BRIEF DESCRIPTION OF THE DRAWINGS

FIG. 5 is a top plan view of a wire distribution apparatus for use with the test shoe of the present invention;

FIG. 6 is a perspective view of an electrical connector mounted on a termination module;

DESCRIPTION OF THE PREFERRED EMBODIMENT

Figure 1:
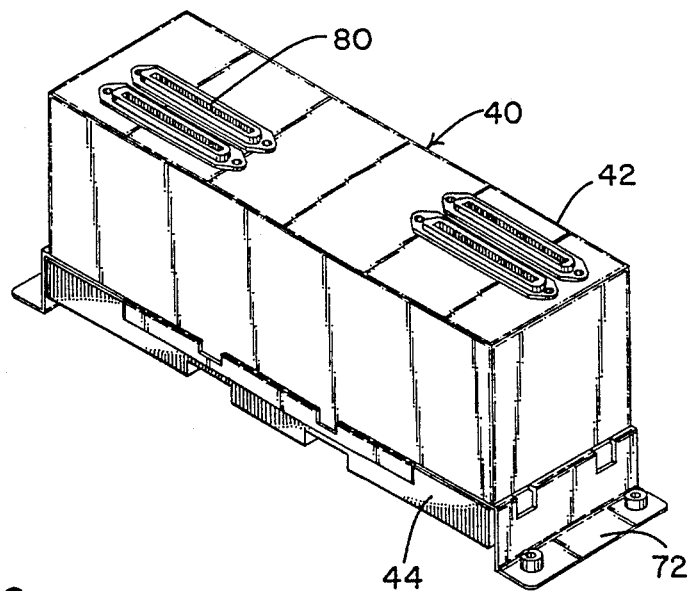
FIG. 1 is a perspective view of a test shoe according to the present invention.

Referring to the drawings in which identical elements are numbered identically throughout, a test shoe is shown for use with a wire distribution apparatus. The wire distribution apparatus is shown in FIG. 5 and is preferably constructed according to the teachings of commonly assigned and copending U.S. patent application Ser. No. 864,023. It is disclosed more fully in that application, which is incorporated herein by ference. Referring to FIG. 5, the wire distribution apparatus includes a frame member 10 on which is mounted a plurality of wire distribution modules 12 and 12'. Each of modules 12 and 12' is identical and therefore their parts are numbered identically except for the addition of an apostrophe to those elements of module 12'. Module 12 is shown in a closed position and module 12' is shown in an open position and retained by bracing members 14.

Each of modules 12 and 12' are comprised of first and second panel members 16 and 18. With reference to panel member 16, the panel includes a forward portion 16a and rear portion 16b. On the exterior surface of rear portion 16b, a plurality of connector elements 20 are provided. Connector elements 20 are shown most clearly in FIG. 6 and are preferably identical to those shown and described in commonly assigned U.S. Pat No. 4,688,872 which is incorporated herein by reference.

Connector elements 20 comprise a housing 22 of dielectric material which houses a plurality of split cylinder connector elements 24. In FIG. 6, part of the housing 22 is shown broken away to expose a split cylinder connector element 24.

Figure 4:
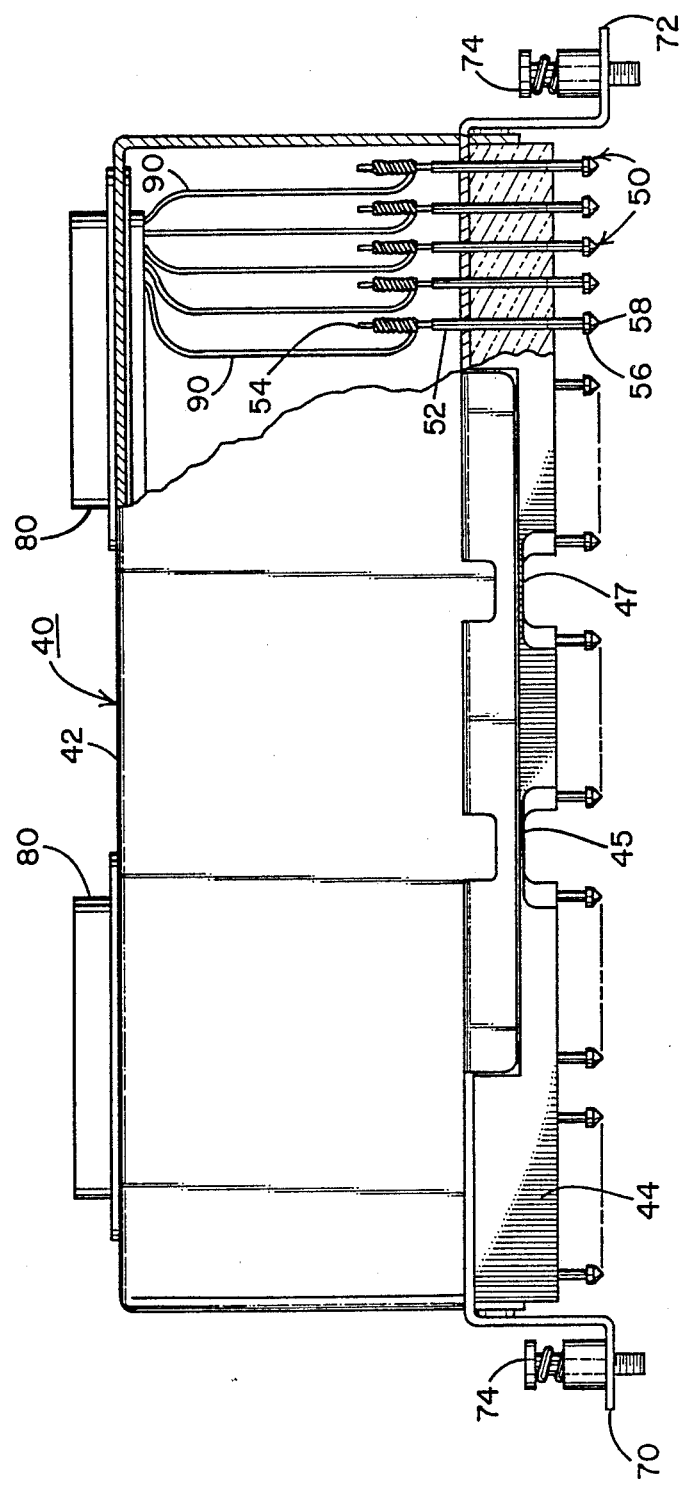
FIG. 4 is a side view taken in elevation and partially exposed showing the test shoe of FIG. 1.

As shown in FIG. 4 of the aforementioned U.S. Pat. No. 4,688,872, the split cylinder connectors 24 have two wire engaging slots (numbered 33 and 39 in the aforesaid patent) so that wires can be inserted and connected to the exterior side 20a of connector 20 as well as the interior side 20b of connector 20. The connectors 20 are adapted to be received within preformed openings 21 in panel portion 16a.

With connector 20 inserted within face 16b of panel 16, terminal ends 26 of the split cylinder connectors 24 are exposed. As shown in FIG. 6, the terminal ends 26 are arranged in a predetermined array.

In the example of the preferred embodiment, each of the connectors includes 10 individual split cylinder connectors 24. As a result, each connector 20 can accommodate five pairs of contacts on both the interior and exterior of the module. Namely, in telecommunications, conductors are associated in a pair of tip and ring conductors. Each of connectors 20 can operate to cross-connect five tip and ring pairs of wires exterior to the module 12 with five tip and ring pairs of wires on the interior of the module 12.

Figure 7:
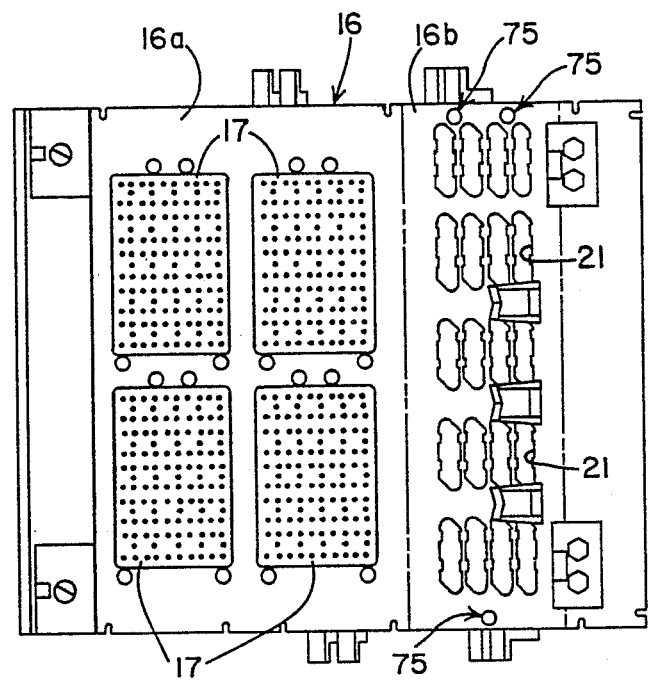
FIG. 7 is a view taken in elevation of an exterior surface of a panel of the distribution module of FIG. 5.

As shown in FIG. 7, the forward panel portion 16a accommodates four columns of connectors 20 with each column containing five connectors. As a result, 100 total tip and ring pairs can be cross-connected per panel 16. For ease of illustration, only preformed openings 21 are shown in FIG. 7 into which connectors 20 are inserted.

The panel 16 includes a protector field located on forward panel portion 16a. In the embodiment shown in FIG. 7, the protector field includes four blocks of protector modules 17. Each block can accommodate protector circuits for 25 tip and ring pairs. It will be appreciated that protector blocks 17 and related protector circuits are commercially available items and form no part of this invention per se.

Figure 8:
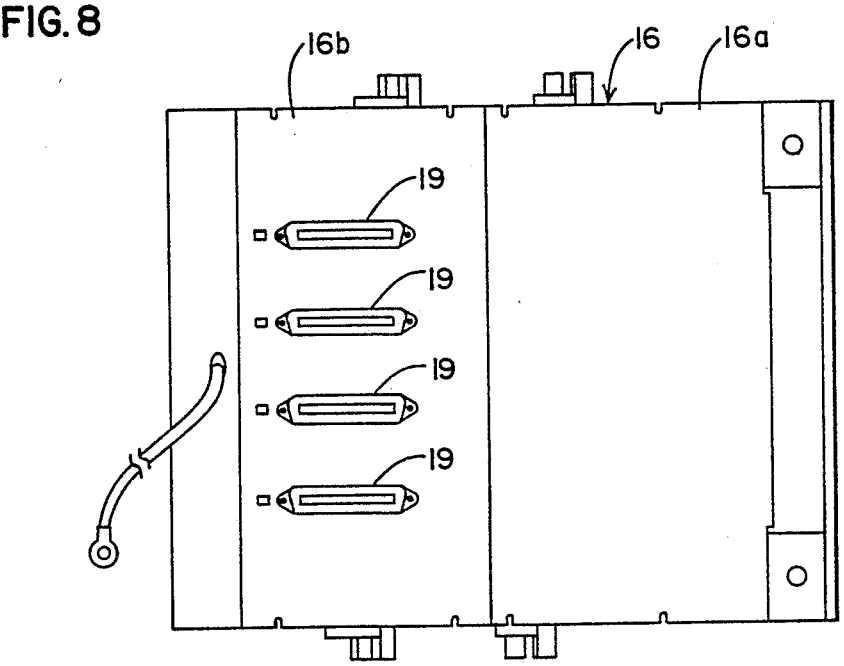
FIG. 8 is a view taken in elevation of the interior surface of the panel of FIG. 7.

Referring to FIG. 8, the interior surface of the panel 16 is provided with four 50-pin connectors 19 which can be releasably connected to cables (not shown). 50-pin connectors can accommodate 25 pairs of tip and ring wires. Cables (which are conveniently referred to as IN cables) carrying twenty-five tip and ring pairs are terminated at the four 50-pin connectors which are adapted to mate with the 50-pin connectors 19 on the interior surface of panel 16. The 50-pin connectors are wired to the protector blocks 17 which are in turn wired to the interior connector elements of connectors 20. The protector blocks 17 can then receive circuit protector devices such as over-current or over-voltage protectors.

Figure 3:
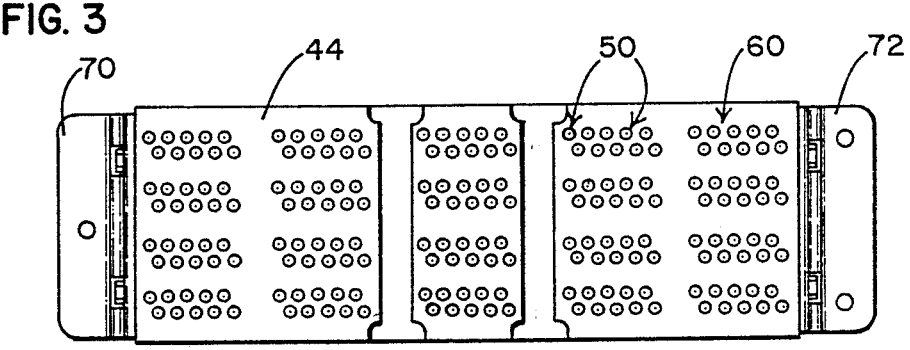
FIG. 3 is a bottom plan view of the test shoe of FIG. 1.

The test shoe 40 of the present invention includes a housing 42 having a bottom face plate 44 of dielectric material. The base plate 44, shown in FIG. 3, carries a plurality of test pins 50.

Figures 9, 10:
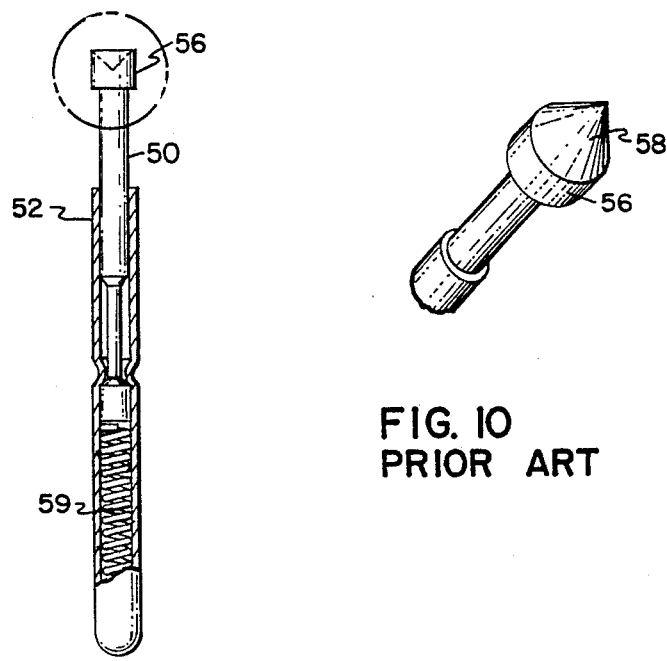
FIG. 9 is a side view in elevation and partially exposed showing a resiliently biased spring contact probe, known in the art.
FIG. 10 is an enlarged perspective view of the insert of FIG. 9.

The test pins 50 are best shown in FIG. 4. Each of the test pins 50 include an outer sleeve 52 which is fixedly carried by the base plate 44. Extending from sleeve 52 into the interior of the housing 42 is a wire wrap termination pin 54. Extending from the sleeve 52 exterior of housing 52 is a test head 56 having a conical terminal end 58. Preferred end 58 is best shown in FIG. 10. Head 56 is reciprocally received within sleeve 52 to be movable in a direction along the axis of pin 50. A spring 59, shown in FIG. 9, biases the pin such that head 56 is urged to the extended position away from base 44. It will be appreciated that a pin such as spring loaded pin 50 forms no part of this invention per se. Such devices are commercially available and are obtainable through Interconnect Devices, Test Components Division, 510 Richland Ave., Kansas City, Kans. catalog. (Their catalog numbers are S4E7G for the spring loaded pin and R4WW for the spring loaded pin receptacle).

Figure 2:
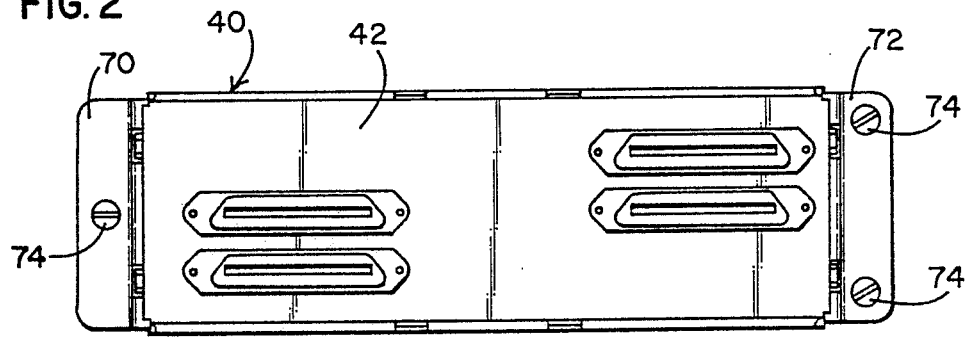
FIG. 2 is a top plan view of the test shoe of FIG. 1.

As shown in the figures, each of the spring loaded pins 50 are arranged in a predetermined array and grouped together in pairs of ten. Each grouping such as grouping 60 are arranged in four columns of five grouping 60 per column. Accordingly, the pins 50 are arranged in the same array as the exposed ends 26 of the connectors of connectors 20. The housing 40 includes flanged elements 70 and 72 carrying captive screws 74, as shown in FIGS. 1 and 2 (not shown in the view of FIG. 1). Threaded screw receiving holes 75 are provided on the rear panel portion 16b such that housing 42 can be releasably attached to rear panel portion 16b in a predetermined position such that array of pins 50 is aligned with the array of connectors 20. With the housing so connected to panel portion 16b, each of conical pin ends 58 is in unique electrical communication with each of the split cylinder connectors 24 of connector modules 20.

The test shoe 40 further includes a plurality of electrical connectors 80. Connectors 80 are preferably 25 pair (50 pin) connectors. These are similar in construction to connectors 19. Such connectors are manufactured by AMP Inc. of Harrisburg, Pa. and identified by their part number 553920-1. Four 50 pin connectors are provided with each pin of the connectors uniquely wired by interiorly housed wires 90 to the wire wrap post 54 of pins 50. As a result, test equipment having a mating cable for pin connectors 80 can be connected to the test shoe 40 and thereby be uniquely connected to each of the pins 50 and the connector elements 24 of connector 20. Such test equipment can test the signals and the telecommunication wires of the wire distribution apparatus. Unlike the prior art, the present apparatus requires only a protector field and a cross connect field without the need for a separate test access field and without the need for test accessing through protector modules. This results in enhanced density of a wire distribution frame and significant cost savings. To assist in wire management, the bottom plate 44 includes cross troughs 45 and 47 which accommodate space for wires terminated on the cross connector elements 20.

From the foregoing detailed description of the present invention, it has been shown how the invention has been attained in the preferred manner. However, modifications and equivalents of the disclosed concepts such as readily occur to those skilled in the art are intended to be included in the scope of this invention. Thus, the scope of the invention is intended to be limited only by the scope of the claims such as are or may hereafter be appended hereto.

We claim:

1. A wire distribution apparatus, comprising:
   a wire termination module having means defining a module interior separated from an exterior;
   a wire termination field having a plurality of electrical connectors carried on said module, said connectors having a first plurality of electrical contact points disposed to receive a first plurality of electrical conductors exterior of said module, said connectors further including a second plurality of electrical contact points disposed to receive a second plurality of electrical conductors from said interior of said module, said connectors also including electrical test contact points disposed in a predetermined first array and exposed to said exterior;
   a plurality of circuit protector elements carried on said module, said elements in electrical contact with said connectors;

a test member for accessing test equipment to test signals carried by said conductors, said test member having a housing, attaching means for releasably attaching said housing to said module in a predetermined position, a plurality of electrical contact members carried by said housing and having exposed contact ends arranged in a second array with said exposed contact ends disposed to electrically engage said test contact points when said housing is attached to said module in said predetermined position, electrical connector means carried on said housing for electrically connecting circuit test equipment to said electrical contact members.

2. An apparatus according to claim 1 wherein said test member contact members include a plurality of parallel aligned test pins having said exposed contact ends, said ends reciprocally movable along an axis of said pins and resiliently biased to an extended position.

3. An apparatus according to claim 2 wherein said test pins have a plurality of wire termination pins disposed within said housing, said electrical connector means wired to said test pins.

4. A wire distribution apparatus comprising:
a wire termination field having a plurality of electrical connectors including a first plurality of electrical contact points for receiving a first plurality of electrical conductors and a second plurality of electrical contact points to receive a second plurality of electrical conductors, said plurality of electrical connectors further including electrical test contact points disposed in an exposed predetermined first array;

a circuit protector field with circuit protector means electrically connecting said circuit protector field with said wire termination field;

a test member for accessing test equipment to test signals carried by conductors, said test member including a housing, means for attaching said housing to said wire distribution apparatus in a predetermined position, a plurality of electrical contact members carried by said housing and having exposed contact ends arranged in a second array with said exposed contact ends disposed to electrically engage said test contact points when said housing is attached to said apparatus in said predetermined position, electrical connector means carried on said housing for electrically connecting circuit test equipment to said electrical contact members.

5. An apparatus according to claim 4 wherein said test member contact member include a plurality of parallel aligned test pins having said exposed contact ends with said ends reciprocally movable along an axis of said pins and resiliently biased to an extended position.

6. An apparatus according to claim 5 wherein said test pins have a plurality of wire termination pins disposed within said housing, means for wiring said electrical connector means to said test pins.

* * * * *

UNITED STATES PATENT AND TRADEMARK OFFICE
CERTIFICATE OF CORRECTION

PATENT NO. : 4,901,206

DATED : February 13, 1990

INVENTOR(S) : James Dewey, et al.

It is certified that error appears in the above-identified patent and that said Letters Patent is hereby corrected as shown below:

Column 2, Line 38, "ference" should read -- reference --.

Column 3, Line 56, "52" should read -- 42 -- after the word "housing".

Column 3, Line 66, delete "catalog" after the word "Kans."

Column 4, Lines 4 & 5, "grouping" should read -- groupings --.

Column 4, Lines 9 & 10, delete "(not shown in the view of Fig. 1)".

Column 6, Line 22, "member" should read -- members --.

Column 3, Line 68, "receptacle)." should read -- receptacle.) --.

Signed and Sealed this

Twenty-eighth Day of April, 1992

Attest:

HARRY F. MANBECK, JR.

*Attesting Officer*  *Commissioner of Patents and Trademarks*